(12) United States Patent  
Chernyak et al.

(10) Patent No.: US 11,838,508 B2  
(45) Date of Patent: Dec. 5, 2023

(54) APPARATUS AND METHOD FOR CHROMINANCE QUANTIZATION PARAMETER DERIVATION

(71) Applicant: HUAWEI TECHNOLOGIES CO., LTD., Shenzhen (CN)

(72) Inventors: Roman Igorevich Chernyak, Moscow (RU); Jianle Chen, San Diego, CA (US); Alexander Alexandrovich Karabutov, Moscow (RU); Sergey Yurievich Ikonin, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 17/330,148

(22) Filed: May 25, 2021

(65) Prior Publication Data

US 2021/0281845 A1 Sep. 9, 2021

Related U.S. Application Data

(63) Continuation of application No. PCT/RU2019/050226, filed on Nov. 26, 2019.

(Continued)

(51) Int. Cl.
*H04N 19/124* (2014.01)
*H04N 19/172* (2014.01)

(Continued)

(52) U.S. Cl.
CPC ......... *H04N 19/124* (2014.11); *H04N 19/172* (2014.11); *H04N 19/176* (2014.11); *H04N 19/184* (2014.11); *H04N 19/186* (2014.11)

(58) Field of Classification Search
None
See application file for complete search history.

(56) References Cited

U.S. PATENT DOCUMENTS

2011/0255595 A1 10/2011 Zuo et al.
2014/0233659 A1* 8/2014 Narroschke ............ H04N 19/14
375/240.29

(Continued)

FOREIGN PATENT DOCUMENTS

WO 2017206826 A1 12/2017
WO 2018013706 A1 1/2018

OTHER PUBLICATIONS

"Line Transmission of Non-Telephone Signals," ITU-T H.261 (Mar. 1993), Video Codec for Audiovisual Services at p x 64 kbits, total 29 pages, International Telecommunication Union, Geneva, Switzerland (Mar. 1993).

(Continued)

*Primary Examiner* — Mohammad J Rahman
(74) *Attorney, Agent, or Firm* — Leydig, Voit & Mayer, Ltd.

(57) ABSTRACT

A method for inverse quantization of a current block of a picture is performed by a decoder, and the picture comprises a luminance component and a chrominance component, wherein the luminance component and the chrominance component are partitioned into multiple blocks. The method includes: obtaining one or more existing quantization parameter (QP) values from a received bitstream, wherein the one or more existing QP values relate to a current block in the chrominance component; determining a QP value for the current block in the chrominance component based on the one or more existing QP values; and performing inverse quantization on the current block in the chrominance component by using the determined QP value.

9 Claims, 9 Drawing Sheets

Related U.S. Application Data

(60) Provisional application No. 62/771,477, filed on Nov. 26, 2018.

(51) Int. Cl.
*H04N 19/176* (2014.01)
*H04N 19/184* (2014.01)
*H04N 19/186* (2014.01)

(56) References Cited

U.S. PATENT DOCUMENTS

| | | | |
|---|---|---|---|
| 2014/0254677 A1* | 9/2014 | Oh | H04N 19/176 |
| | | | 375/240.12 |
| 2015/0016541 A1* | 1/2015 | Narroschke | H04N 19/15 |
| | | | 375/240.24 |
| 2015/0373332 A1 | 12/2015 | Kim et al. | |
| 2016/0100167 A1 | 4/2016 | Rapaka et al. | |
| 2016/0261867 A1* | 9/2016 | Oh | H04N 19/172 |
| 2017/0163994 A1* | 6/2017 | Sanchez De La Fuente | |
| | | | H04N 19/51 |
| 2017/0353725 A1 | 12/2017 | Sullivan | |
| 2019/0068967 A1* | 2/2019 | Ikai | H04N 19/117 |
| 2019/0149823 A1* | 5/2019 | Lim | H04N 19/70 |
| | | | 375/240.03 |
| 2020/0296374 A1* | 9/2020 | Lim | H04N 19/147 |

OTHER PUBLICATIONS

"Series H: Audiovisual and Multimedia Systems, Infrastructure of audiovisual services—Coding of moving video, Advanced video coding for generic audiovisual services," ITU-T H.264(Apr. 2017), total 812 pages, International Telecommunication Union, Geneva, Switzerland (Apr. 2017).

"Series H: Audiovisual and Multimedia Systems Infrastructure of audiovisual services—Coding of moving video, High efficiency video coding," ITU-T H.265(Feb. 2018), total 692 pages, International Telecommunication Union, Geneva, Switzerland (Feb. 2018).

Chernyak et al., "Non-CE7: Delta QP for Chroma CU," Joint Video Experts Team (JVET) of ITU-T SG 16 WP 3 and ISO/IEC JTC 1/SC 29/WG 11, 13th Meeting: Marrakech, MA, Document: JVET-M0105-v3, pp. 1-3 (Jan. 9-18, (2019).

Chernyak et al., "Delta QP and Chroma QP Offset for Separate Tree," Joint Video Experts Team (JVET) of ITU-T SG 16 WP 3 and ISO/IEC JTC 1/SC 29/WG 11,12th Meeting: Macao, CN, Document: JVET-L0428-v1, pp. 1-5 (Oct. 3-12, 2018).

\* cited by examiner

X Location of luma sample
O Location of chroma sample

X Location of luma sample
O Location of chroma sample

X Location of luma sample
O Location of chroma sample

APPARATUS AND METHOD FOR CHROMINANCE QUANTIZATION PARAMETER DERIVATION

CROSS-REFERENCE TO RELATED APPLICATION

This application is a continuation of International Application No. PCT/RU2019/050226, filed on Nov. 26, 2019, which claims priority to U.S. Provisional Application No. 62/771,477 filed on Nov. 26, 2018. The disclosures of the aforementioned applications are hereby incorporated by reference in their entireties.

TECHNICAL FIELD

The present disclosure relates to the technical field of image and/or video decoding, and in particular to an apparatus and method for inverse quantization.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

Video compression techniques such as inter prediction, intra prediction and loop filters have demonstrated to be effective and thus adopted into various video coding standards, such as H.264/AVC and H.265/HEVC.

Basic processing unit of video compression is usually called macroblock which is a part of picture having size e.g. 16×16 or 64×64 pixels. In the latest video coding standard H.265/HEVC so-called coding tree unit (CTU) is used as a basic processing unit. CTU is also referred to as largest coding unit (LCU). In H.265/HEVC CTUs consist of one luma coding tree block (CTB) and two chroma CTBs correspondently represent luminance and chrominance video signal parts, e.g. Y, Cb, Cr components. CTUs are processed one by one in scan order from top-left to bottom-right corner of the picture. Each CTU may be further divided on smaller coding units (CU) by using e.g. quad-tree split. Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference sample to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized.

Hence, reconstructed pixels contain quantization noise (it can become apparent, for examples, as blockiness between units, ringing artifacts along with sharp edges, etc.) that in-loop filters such as de-blocking filter (DBF), sample-adaptive offset (SAO) and adaptive loop filter (ALF) try to suppress. The use of sophisticated prediction coding (such as motion compensation and intra-prediction) and partitioning techniques (e.g., quad-tree (QT) for CUs and PUs as well as residual quad-tree (RQT) for TUs in the HEVC/H.265 standard and multiple tree (MT) for the Versatile Video Coding (VVC) reference software starting from version BMS-1.0 and VTM-1.0) allow to significantly reduce the redundancy in PUs. The fundamental difference between QT and MT partitioning mechanisms is the latter one also allows rectangular blocks by using binary and triple trees-based partitioning as well as square blocks by using quad tree approach. As the video creation and use have become more and more ubiquitous, video traffic is the biggest load on communication networks and driver for increasing data storage demands. Accordingly, one of the goals of most of the video coding standards is to lower coding complexity compared to its predecessor without sacrificing picture quality.

SUMMARY

Apparatus and method for boundary partition are disclosed. The apparatus and method use a particular boundary partition processing for decreasing the coding complexity. Boundary partition processing is also referred to as a picture or image boundary handling.

A video image may be divided into luminance (or luma) component and chrominance (or chroma) component. The luminance or luma component represents the brightness in the image (the "black-and-white" or achromatic portion of the image), and chrominance or chroma component(s) represent color information of the image. Just as an example, when a picture or an image is denoted in the color space of [Y, Cb, and Cr], the Y component is the luminance (or luma) component, and the Cb and Cr components are the chrominance or chroma component(s).

The luminance component and the chrominance component are partitioned into multiple blocks by separate partition trees. In other words, the luminance component and the chrominance component are partitioned separately. It is known that there are different partition trees, for example, quad-tree (QT), binary tree (BT), ternary tree (TT), and any combination of the above partition trees, for example, quad-tree plus binary tree (QTBT), or quad-tree plus binary tree or ternary tree (QT-BT/TT), etc.

According to a first aspect of the invention, a method of obtaining a quantization parameter value for a current block of a chrominance component of a picture is provided. The quantization parameter value is a quantization parameter value to be used in inverse quantization of the current block of the chrominance component. The method comprises the steps of parsing a bitstream, in order to obtain a differential quantization parameter value for the current block of the chrominance component and of determining the quantization parameter value for the current block of the chrominance component as a predetermined function of the obtained differential quantization parameter value and quantization parameter values of: a coding unit of the luminance component collocated to the current block, at least one neighboring block of the current block in said chrominance component, and at least one coding unit of the luminance component that is collocated to the at least one neighboring block.

It is the particular approach of the present invention to determine a quantization parameter (QP) value to be used in inverse quantization of the current block in a chrominance component based on a differential quantization parameter value which is signaled in the bitstream as well as available quantization parameters of a co-located luminance block and at least one neighboring block in the chrominance and luminance components. The differential quantization parameter generally relates to a difference in quantization parameter values between the current block of the luminance component and a coding unit of the luminance component of the picture that is collocated to the current block. Taking further into account the neighboring block(s) in the chrominance and luminance components may enable reducing the magnitude of the differential quantization parameter value to be signaled, thereby reducing the amount of signaling overhead in the bitstream and enhancing coding efficiency.

The quantization parameter values of collocated luminance block and neighboring blocks may be available, since these blocks were decoded previously. These quantization parameter values may therefore be considered "existing" quantization parameter (QP) values.

Terms like "block" or "coding unit of the luminance component collocated to the current block (of the chrominance component)" or "the collocated block in the luminance component" mean a block in the luminance component which is collocated to the block in the chrominance component. More specifically, here, the term "collocated" means the existence of a predetermined mapping relation between blocks (units) of the luminance and the chrominance components of a picture. An exemplary mapping relation will be explained below with reference to FIG. 8.

According to an example of the first aspect of the invention, the differential quantization parameter obtained from the bitstream in the parsing step is valid for both the Cb chrominance component and the Cr chrominance component of the picture. The signaled differential quantization parameter value may also be designated sometimes as "chrominance delta QP value".

According to an example of the first aspect of the invention, the predetermined function may be a function of the obtained differential quantization parameter and quantization parameter values of the coding unit of the luminance component collocated to the current block, the left neighboring block of the current block in the chrominance component and the coding unit of the luminance component that is collocated to said left neighboring block. This may ensure availability of the necessary quantization parameter values in a simple manner, because these blocks are usually decoded before the current block.

According to an example of the first aspect of the invention, the predetermined function may be a function of the sum of the obtained differential quantization parameter value and the quantization parameter value of the coding unit of the luminance component collocated to the current block. This shows the technical significance of the differential quantization parameter as relating to a difference in quantization parameter values between collocated luminance and chrominance blocks.

According to an example of the first aspect of the invention, the predetermined function may be a function of the difference of the quantization parameter value of the left neighboring block of the current block in said chrominance component and the quantization parameter value of the coding unit of the luminance component collocated to said left neighboring block.

According to an example of the first aspect of the invention, the method further comprises: obtaining a partition depth value of the current block, and determining the QP value for the current block in the chrominance component based on the one or more existing QP values and a chrominance delta QP value signaled in the received bitstream, if the partition depth value is below a threshold.

In this way, it is not needed to apply this way to the block with a depth value which is above the threshold, so this reduce the complexity of computation.

According to an example of the first aspect of the invention, the threshold is determined based on a pre-defined number, or a number signaled in a parameter set.

For example, this number may be pre-defined by programmer, or may be signaled in a parameter set, for example, picture parameter set (PPS) or sequence parameter set (SPS).

According to an example of the first aspect of the invention, the luminance component and the chrominance component are partitioned into multiple blocks (e.g. coding unit, CU) by separate partition trees.

According to a second aspect of the present invention, a method of inverse quantization of a current block of a chrominance component of a picture is provided. The method comprises the steps of obtaining a quantization parameter value for the current block by performing a method according to the first aspect or any one of the examples of the first aspect and of performing inverse quantization on the current block of the chrominance component by using the obtained quantization parameter.

According to a third aspect of the present invention, a method of decoding transform coded and quantized picture data on a block-wise basis is provided. The method includes the step of performing inverse quantization of a current block by a method according to the second aspect.

According to a fourth aspect of the present invention, a method of encoding picture data on a block-wise basis is provided. The method includes the steps of performing transform processing and quantization processing of a current block of the picture data and of performing a method according to the third aspect of the present invention in a decoding loop for prediction processing.

According to a further aspect of the disclosure, a method for inverse quantization of a current block of a picture is provided. The picture comprises a luminance component and a chrominance component, the luminance component and the chrominance component are partitioned into multiple blocks (e.g. coding unit (CU)) by separate partition trees. The method includes that a decoder obtains one or more existing quantization parameter (QP) values. Optionally, these values may be obtained from a received bitstream. The one or more existing QP values relate to a current block (i.e. the block being processed) in the chrominance component, and determines a QP value for the current block in the chrominance component based on the one or more existing QP values, and performs inverse quantization on the current block in the chrominance component by using the determined QP value.

The expression "one or more existing QP values relate to a current block in the chrominance component" correspond to the existing QP values which are related to the current block in the chrominance component. Just for example, the existing QP value comprises: a QP value of a collocated block in the luminance component; one or more neighboring blocks of the collocated block in the luminance component; and one or more neighboring blocks of the current block in the chrominance component.

For a block in a chrominance component of the picture, a quantization parameter of the block in the chrominance component may be determined by the one or more existing quantization parameter (QP) values. This provides an efficient way to determine quantization parameter for the block in the chrominance component, and alleviates processing overload of the decoder to determine quantization parameter for each block in the chrominance component.

According to an example of the further aspect of the disclosure, the one or more existing QP values comprises at least one of the following: a QP value of a collocated block in the luminance component; existing QP values of one or more neighboring blocks of the collocated block in the luminance component; and existing QP values of one or more neighboring blocks of the current block in the chrominance component.

This defines the existing QP values, and provides an efficient way for determining the QP value of the block in the chrominance component of the picture.

According to another example of the further aspect of the disclosure, the method further comprises: determining the QP value for the current block in the chrominance component based on the QP value of the collocated block in the luminance component.

This example provides an easy way to determine the QP value of a block in the chrominance component. Because the luminance component and the chrominance component of a picture has relation, so it is an easy and direct way to regard the QP value of the collocated block in the luminance component as the QP value of the block in the chrominance component.

According to an example of the further aspect of the disclosure, the method further comprises: determining the QP value for the current block in the chrominance component based on a weighted sum of existing QP values of the one or more neighboring blocks of the collocated block in the luminance component.

Just for example, there are four neighboring blocks of the collocated block in the luminance component, so the QP value for the current block in the chrominance component is an average sum of the QP values for the four neighboring blocks of the collocated block in the luminance component.

On some occasions, the neighboring blocks of the collocated block may be not existing. Under this circumstance, it is recommend to using other existing QP values to determine the QP value of the block in the chrominance component.

According to an example of the further aspect of the disclosure, the method further comprises: determining the QP value for the current block in the chrominance component based on a weighted sum of existing QP values of the neighboring blocks of the current block in the chrominance component.

According to an example of the further aspect of the disclosure, the method further comprises: determining the QP value for the current block in the chrominance component based on both the QP value of collocated block in the luminance component and a weighted sum of existing QP values of the neighboring blocks of the current block in the chrominance component.

According to an example of the further aspect of the disclosure, the method further comprises: determining the QP value for the current block in the chrominance component based on both a weighted sum of existing QP values of the neighboring blocks of the current block in the chrominance component and a weighted sum of existing QP values of the neighboring blocks of the collocated block in the luminance component.

It is noted that a harmonized method for inverse quantization is provided, this method is not only apply to a single partition mode (i.e. luma and chroma component(s) are partitioned by a single partition), but also apply to a dual partition mode (i.e. luma and chroma component(s) are partitioned independently by separate partition trees).

According to a fifth aspect of the present invention, a decoding apparatus is provided comprising processing circuitry for carrying out a method according to any one of the first to third aspects or any one of the examples of the first aspect.

According to a sixth aspect of the present invention, an encoding apparatus is provided comprising processing circuitry for carrying out a method according to any one of the first to fourth aspects or any one of the examples of the first aspect.

According to a seventh aspect of the present disclosure, a computer program product is provided comprising a program code for performing a method according to any one of the first to fourth aspects or any one of the examples of the first aspect, when executed on a computer or a processor.

According to an eighth aspect of the present invention, a decoding apparatus for boundary partition of a current block of a picture is provided. The decoding apparatus includes: one or more processors; and a non-transitory computer-readable storage medium coupled to the processors and storing programming for execution by the processors, wherein the programming, when executed by the processors, configures the decoder to carry out a method according to any one of the first to third aspects or any one of the examples of the first aspect.

According to a ninth aspect of the present invention, an encoding apparatus for a current block of a picture is provided. The decoding apparatus includes one or more processors and a non-transitory computer-readable storage medium coupled to the processors and storing programming for execution by the processors, wherein the programming, when executed by the processors, configures the encoder to carry out a method according to any one of the first to fourth aspects or any one of the examples of the first aspect.

According to a tenth aspect of the present invention, an apparatus for obtaining a quantization parameter value for a current block of a chrominance component of a picture is provided. The quantization parameter value is a quantization parameter value to be used in inverse quantization of the current block of the chrominance component. The apparatus comprises means for parsing a bitstream, in order to obtain a differential quantization parameter value for the current block of the chrominance component. The apparatus further comprises means for determining the quantization parameter value for the current block of the chrominance component as a predetermined function of the obtained differential quantization parameter value and quantization parameter values of: a coding unit of the luminance component collocated to the current block, at least one neighboring block of the current block in said chrominance component, and at least one coding unit of the luminance component that is collocated to the at least one neighboring block.

According to an eleventh aspect of the present invention, a decoding apparatus comprising an apparatus for obtaining a quantization parameter value for a current block according to the tenth aspect is provided.

According to twelfth aspect of the present invention, an encoding apparatus comprising an apparatus for obtaining a quantization parameter value for a current block according to the tenth aspect is provided.

Implementation forms of the second to twelfth aspect correspond to the respective implementation forms of the first aspect. Hence, an implementation form of the method comprises the feature(s) of the corresponding implementation form of the decoding or encoding apparatus and vice versa. The decoding or encoding apparatus may be implemented as a chipset for encoding a video bitstream or decoding an encoded video bitstream.

The advantages of the methods according to the first aspect are the same as those for the corresponding implementation forms according to the second aspect to twelfth aspect.

BRIEF DESCRIPTION OF THE DRAWINGS

In the following exemplary embodiments are described in more detail with reference to the attached figures and drawings, in which.

Figure 1A:
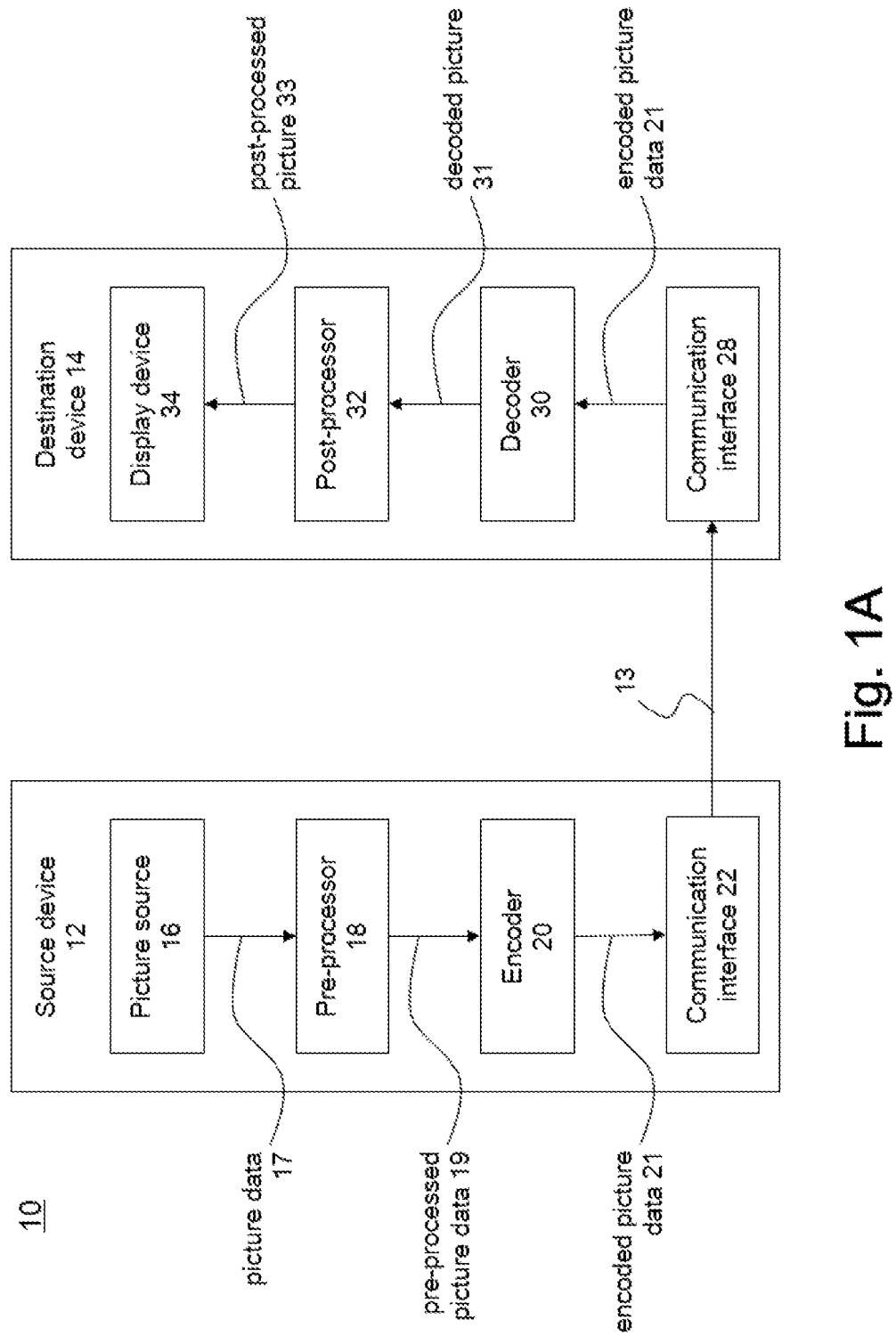
FIG. 1A is a block diagram showing an example of a video coding system configured to implement embodiments of the disclosure.

In the following, identical reference signs refer to identical or at least functionally equivalent features if not explicitly specified otherwise.

DETAILED DESCRIPTION OF EMBODIMENTS

In the following description, reference is made to the accompanying figures, which form part of the disclosure, and which show, by way of illustration, exemplary aspects of embodiments of the disclosure or exemplary aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding used in the present application (or present disclosure) indicates either video encoding or video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for video sequence. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may be a portion of a picture or a frame. For convenience of description, embodiments of the disclosure are described herein in reference to High-Efficiency Video Coding (HEVC) or the reference software of Versatile Video Coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU. In the newest development of the video compression technical, Quad-tree and binary tree (QTBT) partitioning frame is used to partition a coding block. In the QTBT block structure, a CU can have either a square or rectangular shape. For example, a coding tree unit (CTU) is first partitioned by a quad-tree structure. The quad-tree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

In the following embodiments of an encoder 20, a decoder 30 and a coding system 10 are described based on FIGS. 1 to 3.

FIG. 1A is a conceptual or schematic block diagram illustrating an example coding system 10, e.g. a video coding system 10 that may utilize techniques of this present application (present disclosure). Encoder 20 (e.g. video encoder 20) and decoder 30 (e.g. video decoder 30) of video coding system 10 represent examples of devices that may be configured to perform techniques in accordance with various examples described in the present application. As shown in FIG. 1A, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

In monochrome sampling there is only one sample array, which is nominally considered the luma array.

Figure 7A:
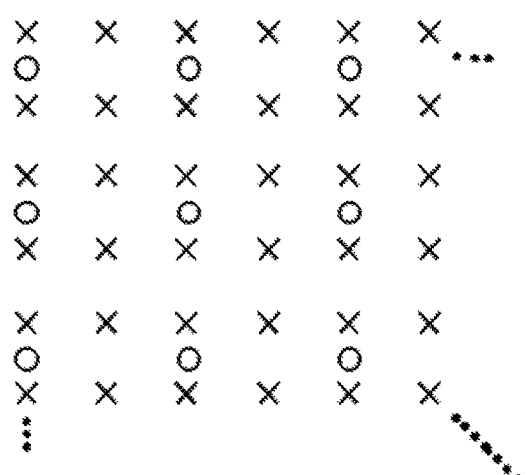
FIG. 7A is a schematic diagram illustrating a nominal vertical and a horizontal locations of 4:2:0 luma and chroma sample in a picture.

In 4:2:0 sampling, as shown in FIG. 7A, each of the two chroma arrays has half the height and half the width of the luma array.

Figure 7B:
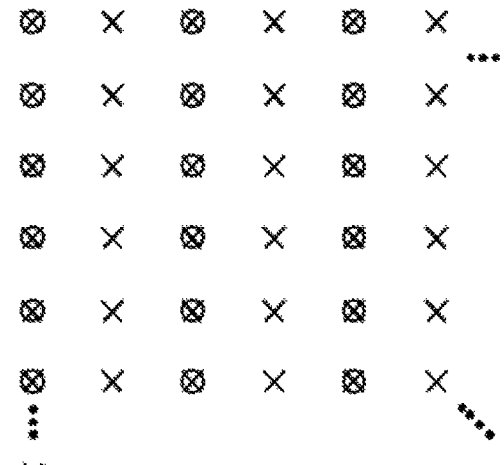
FIG. 7B is a schematic diagram illustrating a nominal vertical and a horizontal locations of 4:2:2 luma and chroma sample in a picture.

In 4:2:2 sampling, as shown in FIG. 7B, each of the two chroma arrays has the same height and half the width of the luma array.

Figure 7C:
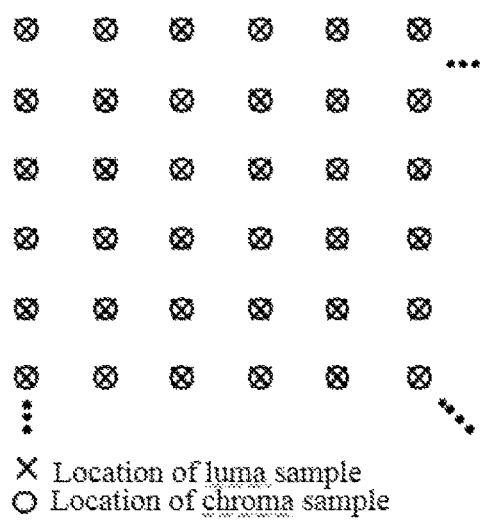
FIG. 7C is a schematic diagram illustrating a nominal vertical and a horizontal locations of 4:4:4 luma and chroma sample in a picture.

In 4:4:4 sampling, as shown in FIG. 7C, depending on the value of separate colour_plane flag, the following applies:

If separate colour_plane flag is equal to 0, each of the two chroma arrays has the same height and width as the luma array;

Otherwise (separate colour_plane flag is equal to 1), the three color planes are separately processed as monochrome sampled pictures.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2 or FIG. 4).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured to receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g. a video encoder 20) and the decoder 30 (e.g. a video decoder 30) each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 may be referred to as a video encoding device or a video encoding apparatus. Destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system.

In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

It should be understood that, for each of the above examples described with reference to video encoder 20, video decoder 30 may be configured to perform a reciprocal process. With regard to signaling syntax elements, video decoder 30 may be configured to receive and parse such syntax element and decode the associated video data accordingly. In some examples, video encoder 20 may entropy encode one or more syntax elements into the encoded video bitstream. In such examples, video decoder 30 may parse such syntax element and decode the associated video data accordingly.

Figure 1B:
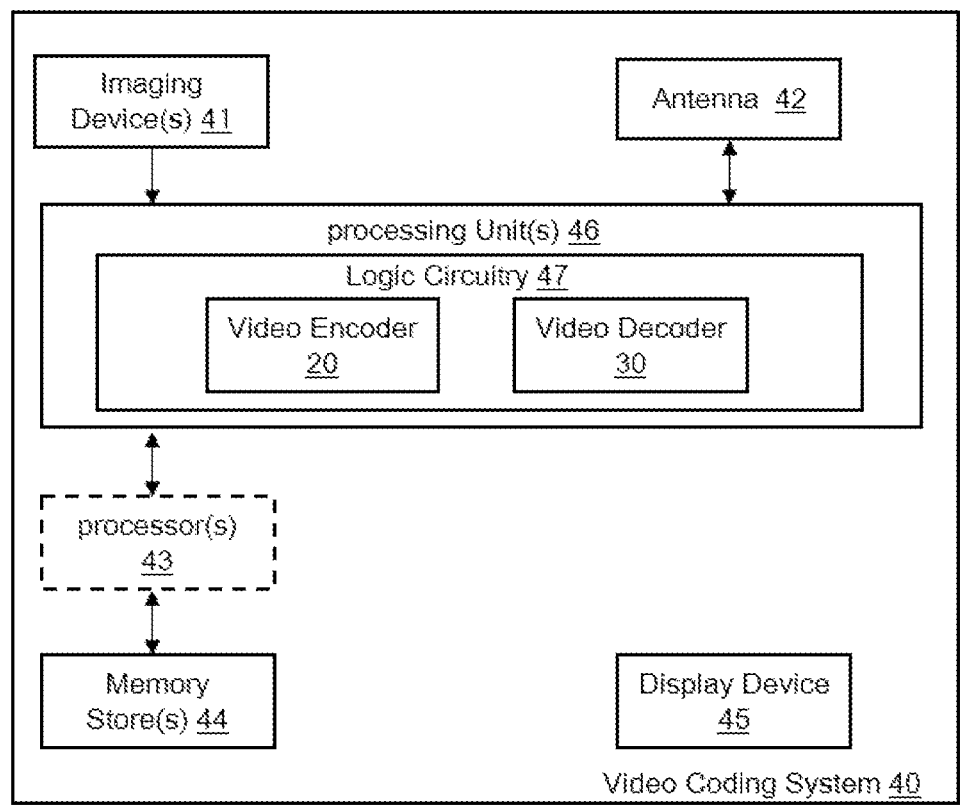
FIG. 1B is a block diagram showing another example of a video coding system configured to implement embodiments of the disclosure.
Figure 2:
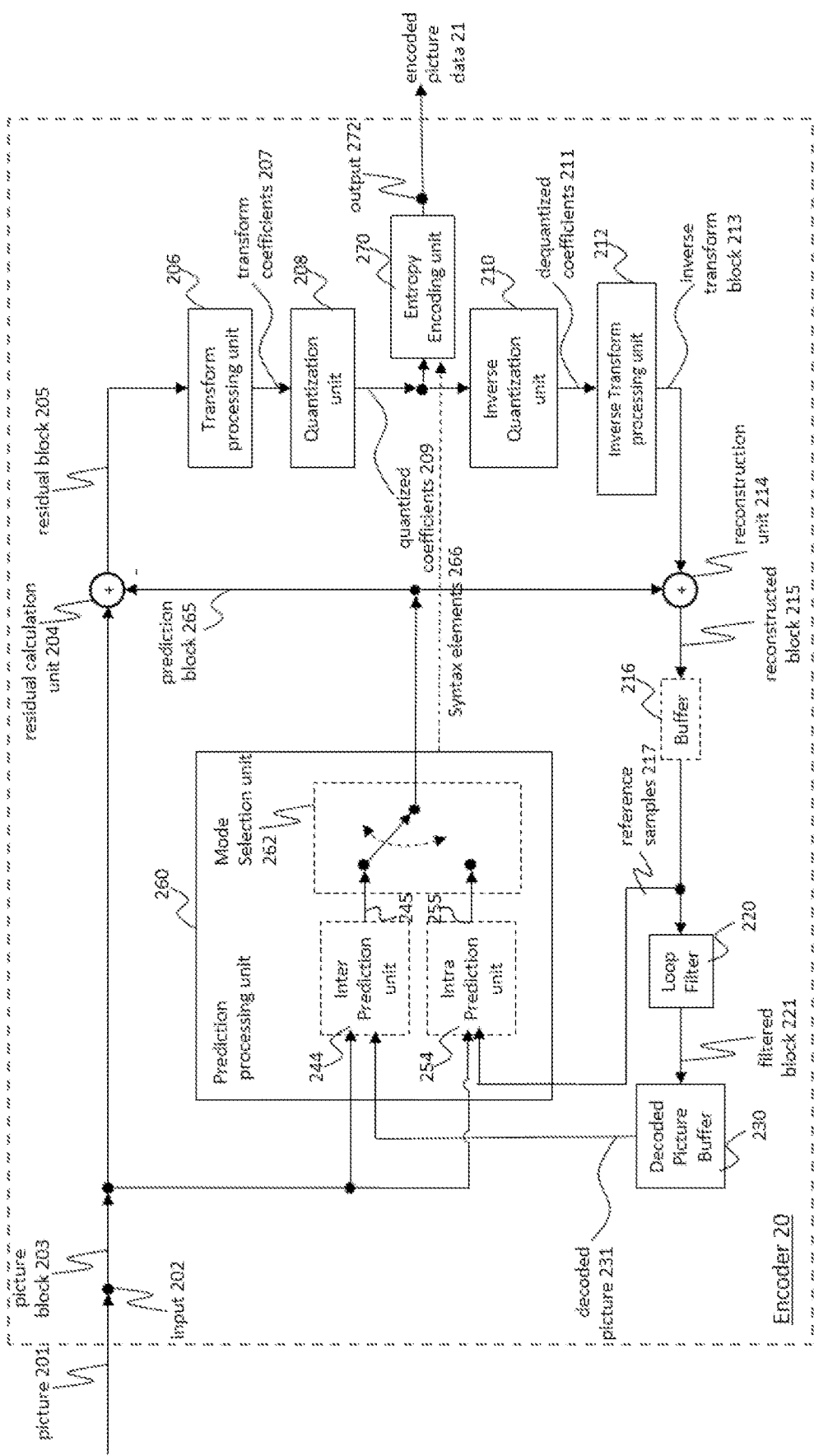
FIG. 2 is a block diagram showing an example of a video encoder configured to implement embodiments of the disclosure.
Figure 3:
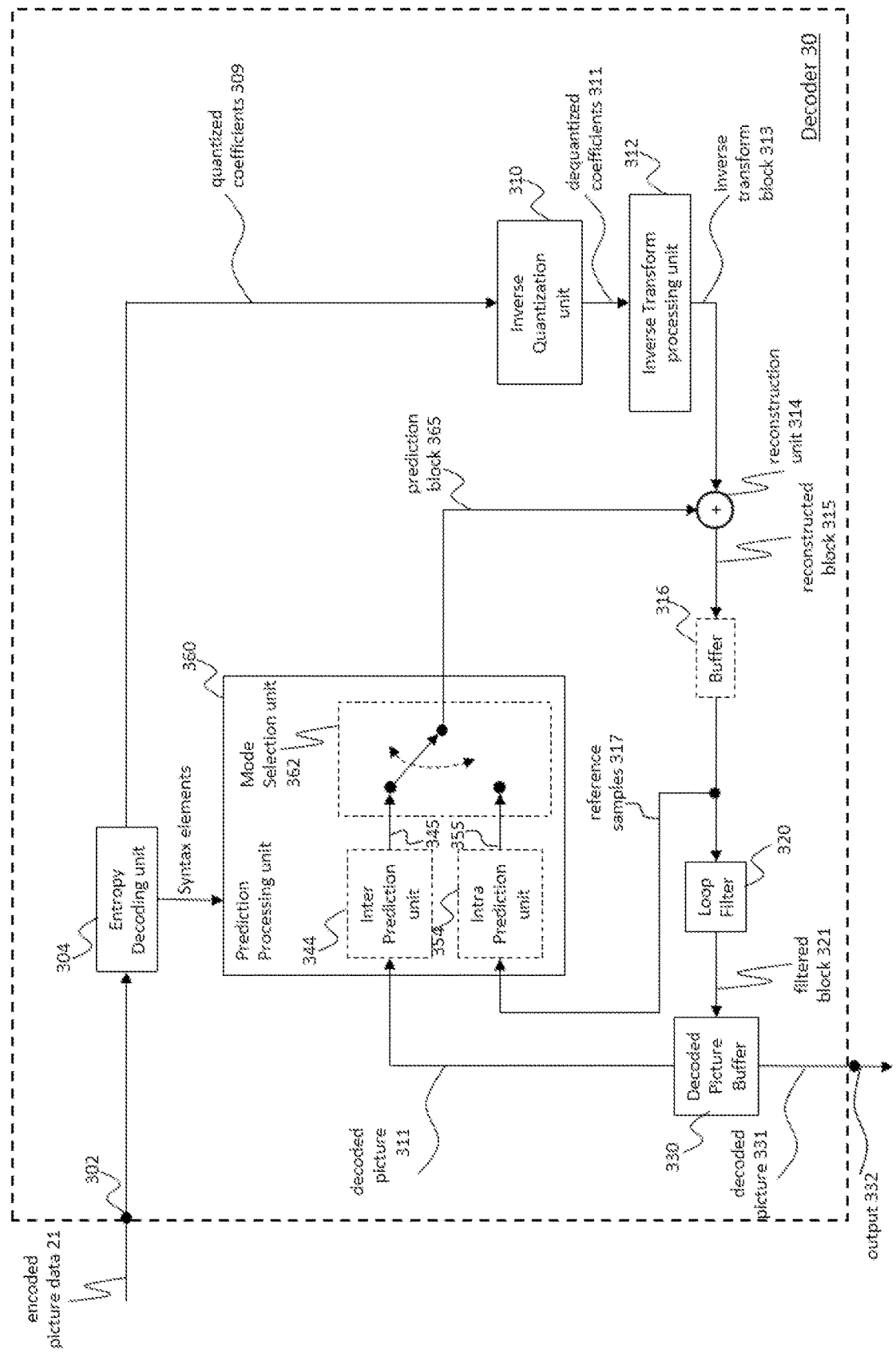
FIG. 3 is a block diagram showing an example structure of a video decoder configured to implement embodiments of the disclosure.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may be implemented via general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In anon-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 100 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 100 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

Encoder & Encoding Method

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit. A video encoder 20 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 20 may comprise a partitioning unit configured to partition the picture 201 into a plurality of blocks, e.g. blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In one example, the prediction processing unit 260 of video encoder 20 may be configured to perform any combination of the partitioning techniques described above.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203.

Encoder 20 as shown in FIG. 2 is configured encode the picture 201 block by block, e.g. the encoding and prediction is performed per block 203.

Residual Calculation

The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

The residual coding of chrominance component of signal can be implemented in two ways: 1) Independent chrominance Cb/Cr component coding; and 2) joint chrominance Cb/Cr components coding. In the first method, Cb and Cr components are coded as two independent signals. In the second method a new signal (joint codeword(s)) is (are) constructed as a function from Cb and Cr and transmitted in the bitstream. Then in the decoding process inverse procedure is applied to derive from joint codeword(s) Cb and Cr signals.

Transform

The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 30 (and the corresponding inverse transform, e.g. by inverse transform processing unit 212 at an encoder 20) and corresponding scaling factors for the forward transform, e.g. by transform processing unit 206, at an encoder 20 may be specified accordingly.

Quantization

The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse de-quantization, e.g. by inverse quantization 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and de-quantization to restore the norm of the residual block, which might get modified because of the scaling used in the fixed point approximation of the equation for quantization step size and quantization parameter. In one example implementation, the scaling of the inverse transform and de-quantization might be combined. Alternatively, customized quantization tables may be used and signaled from an encoder to a decoder, e.g. in a bitstream. The quantization is a lossy operation, wherein the loss increases with increasing quantization step sizes.

The inverse quantization unit 210 is configured to apply the inverse quantization of the quantization unit 208 on the quantized coefficients to obtain de-quantized coefficients 211, e.g. by applying the inverse of the quantization scheme applied by the quantization unit 208 based on or using the same quantization step size as the quantization unit 208. The de-quantized coefficients 211 may also be referred to as de-quantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST), to obtain an inverse transform block 213 in the sample domain. The inverse transform block 213 may also be referred to as inverse transform de-quantized block 213 or inverse transform residual block 213.

The reconstruction unit 214 (e.g. summer 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

Optional, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 20 may be configured such that, e.g. the buffer unit 216 is not only used for storing the reconstructed blocks 215 for intra prediction 254 but also for the loop filter unit 220, and/or such that, e.g. the buffer unit 216 and the decoded picture buffer unit 230 form one buffer. Further embodiments may be configured to use filtered blocks 221 and/or blocks or samples from the decoded picture buffer 230 as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 20 (respectively loop filter unit 220) may be configured to output loop filter parameters (such as sample adaptive offset information), e.g. directly or entropy encoded via the entropy encoding unit 270 or any other entropy coding unit, so that, e.g., a decoder 30 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magneto resistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction processing unit 260 and mode selection (e.g. by mode selection unit 262) performed by an example encoder 20 will be explained in more detail.

As described above, the encoder 20 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined in H.266 under developing.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit and motion compensation (MC) unit. The motion estimation unit is configured to receive or obtain the picture block 203 (current picture block 203 of the current picture 201) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 245. Motion compensation, performed by motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 30 in decoding the picture blocks of the video slice.

The intra prediction unit 254 is configured to obtain, e.g. receive, the picture block 203 (current picture block) and one or a plurality of previously reconstructed blocks, e.g. reconstructed neighbor blocks, of the same picture for intra estimation. The encoder 20 may, e.g., be configured to select an intra prediction mode from a plurality of (predetermined) intra prediction modes.

Embodiments of the encoder 20 may be configured to select the intra-prediction mode based on an optimization criterion, e.g. minimum residual (e.g. the intra-prediction mode providing the prediction block 255 most similar to the current picture block 203) or minimum rate distortion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 3 shows an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements from video encoder 100.

In the example of FIG. 3, the decoder 30 comprises an entropy decoding unit 304, an inverse quantization unit 310, an inverse transform processing unit 312, a reconstruction unit 314 (e.g. an accumulator 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters, e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter-coded (i.e., B or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 311, e.g. via output 312, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
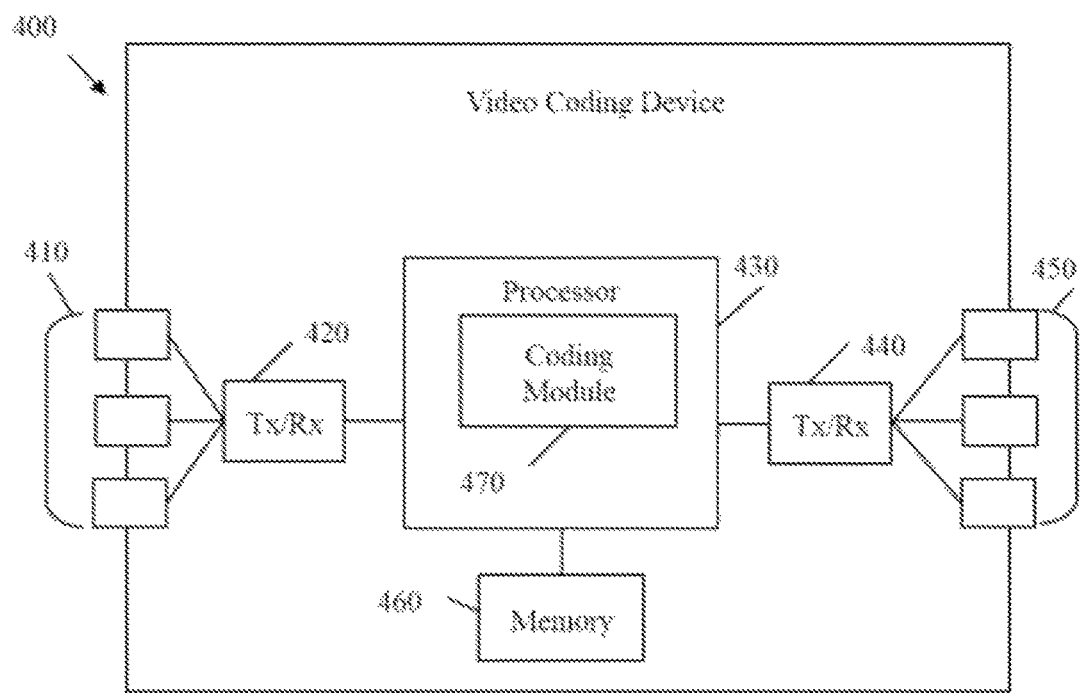
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. In an embodiment, the video coding device 400 may be one or more components of the video decoder 30 of FIG. 1A or the video encoder 20 of FIG. 1A as described above.

The video coding device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
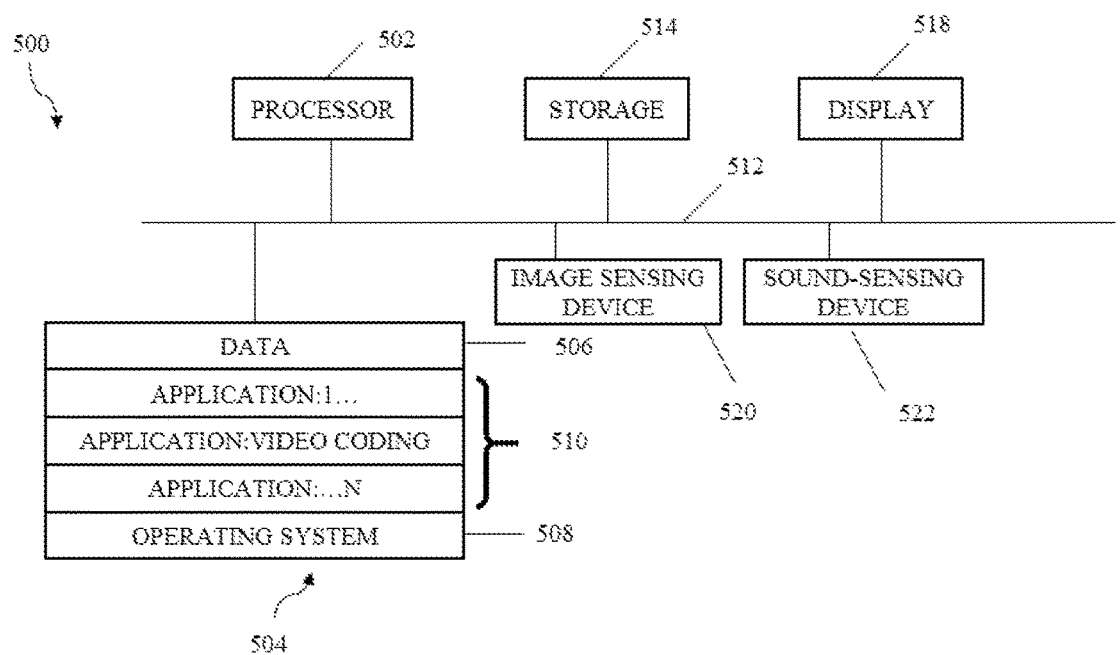
FIG. 5 is a block diagram illustrating another example of an encoding apparatus or a decoding apparatus.

FIG. 5 is a simplified block diagram of an apparatus 500 that may be used as either or both of the source device 310 and the destination device 320 from FIG. 1 according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The video encoder 20 may split the input video frame into blocks before encoding. The term "block" in this disclosure is used for any type block or for any depth block, for example, the term "block" is included but not limited to root block, block, sub-block, leaf node etc. The blocks to be coded do not necessarily have the same size. One picture may include blocks of different sizes and the block rasters of different pictures of video sequence may also differ. FIGS. 6A-6E illustrate Coding Tree Unit (CTU)/Coding Unit (CU) splitting mode in VVC.

Figure 6A:
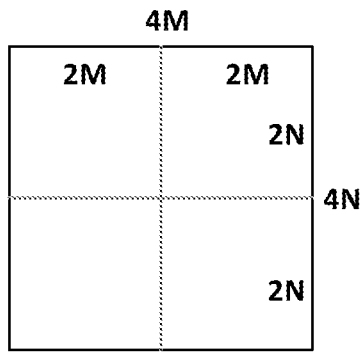
FIG. 6A is a schematic diagram illustrating a quad-tree (QT) split according to an embodiment of the present disclosure.

FIG. 6A illustrates a block partition structure by adopting a quad-tree (QT) split. The QT is a tree structure for block partition in which a node of size 4M×4N may be split into four child nodes of size 2M×2N.

Figure 6B:
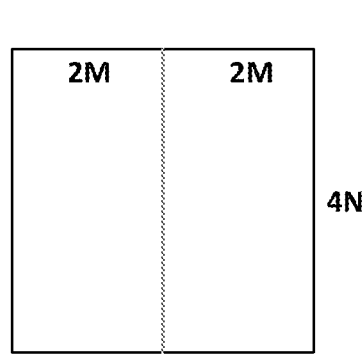
FIG. 6B is a schematic diagram illustrating a binary tree (BT) split in vertical orientation according to an embodiment of the present disclosure.

FIG. 6B illustrates a block partition structure by adopting a binary tree (BT) split in vertical orientation.

Figure 6C:
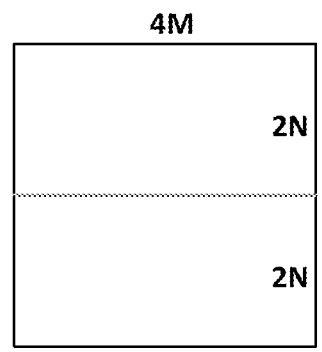
FIG. 6C is a schematic diagram illustrating a binary tree (BT) split in horizontal orientation according to an embodiment of the present disclosure.

FIG. 6C illustrates a block partition structure by adopting a binary tree (BT) split in horizontal orientation. The BT is a tree structure for block partition in which a node of size 4M×4N may either be horizontally split into two child nodes of size 4M×2N or vertically split into two child nodes of size 2M×4N.

Figure 6D:
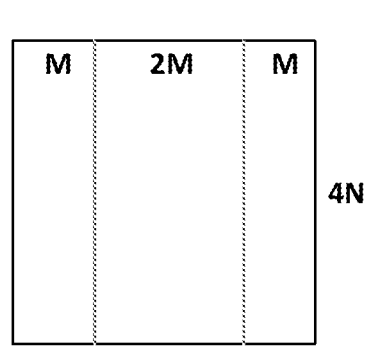
FIG. 6D is a schematic diagram illustrating a ternary tree (TT) split in vertical orientation according to an embodiment of the present disclosure.

FIG. 6D illustrates a block partition structure by adopting a ternary tree (TT) split in vertical orientation.

Figure 6E:
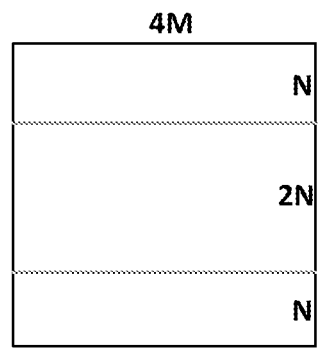
FIG. 6E is a schematic diagram illustrating a ternary tree (TT) split in horizontal orientation according to an embodiment of the present disclosure.

FIG. 6E illustrates block partition structure by adopting a ternary tree (TT) split in horizontal orientation. The TT is a tree structure for block partition in which a node of size 4M×4N may either be horizontally split into three child nodes of size 4M×N, 4M×2N and 4M×N, respectively; or vertically split into three child nodes of size M×4N, 2M×4N and M×4N, respectively. Among the three child nodes shown in FIG. 6D or FIG. 6E, the largest node is positioned in the center.

Quad-tree plus binary tree (QTBT) is a quad-tree plus binary tree structure in which a block is first partitioned using quad-tree split, then each quad-tree child node may be further partitioned using binary tree split. Quad-tree plus binary tree or ternary tree (QT-BT/TT) is a quad-tree plus binary tree or ternary tree structure in which a block is first partitioned using quad-tree split, then each quad-tree child node may be further partitioned using binary tree or ternary tree split.

For a block associated with a particular partition depth, encoder 20 determines which partition type (including no further split) is used and signals the determined partition type explicitly or implicitly (e.g., the partition type may be derived from predetermined rules) to decoder 30. Encoder 20 may determine the partition type to use, for example, based on checking rate-distortion costs for the block using different partition types.

The term "block" in the present disclosure is a generalized term which includes but is not limited to root block, block, sub-block, leaf node etc.

Video coding standards have introduced dual tree (DT) coding in addition to single tree (ST) coding which have been used in HEVC/H.265 standard. ST or DT are selected based on slice or frame type (e.g. intra-frame or inter-frame, intra-slice or inter-slice). Under single tree coding mode, luminance (or luma) and chrominance (or chroma) components share the same partitioning tree. Under the dual tree coding mode, luminance (or luma) and chrominance (or chroma) components are split separately, that is, using independent scheme of partitioning for luma and chroma components.

A picture compression level is controlled by quantization parameter (QP) that may be fixed for the whole picture (e.g. by using a same quantization parameter value), or may have different quantization parameter values for different regions of the picture.

One solution for determining quantization parameter is quantization parameter (QP) signaling at coding unit (CU) level. This approach allows to flexibly vary QP value for different regions of the picture, especially at some CU depths (i.e., partition depth, which defines layers of partition). To signal the QP for certain region of the picture, a delta QP signaling method is used. In this method, the difference (i.e. a delta QP) between a predicted QP (OP cpred) and a real QP of current region is signaled via bitstream. The delta QP value and its granularity (e.g., the size of the partitioned blocks) are defined by an on-off control flag and a maximal depth (e.g., delta QP syntax element(s)) in a picture parameter set (PPS). For all CUs with higher partition depth, the delta QP value is not signaled but may inherit from the top level CUs. In HEVC standard, a QP value for luminance (or luma) coding block (CB) is derived based on predicted QP (qPY_PRED), which in its turn depends on CB location in frame/slice/tile. Then $Qp_Y$ variable is derived by following Equation 1:

$$Qp_Y = ((qPY_{PRED} + \text{CuQpDeltaVal} + 64 + 2*\text{QpBdOffsetY}) \% (64 + \text{QpBdOffsetY})) - \text{QpBdOffsetY} \quad \text{(Equation 1)}$$

Wherein CuQpDeltaVal is a delta QP value which is signaled or derived for a coding unit (CU); QpBdOffsetY is a constant offset depended on luma bit depth (From HEVC standard, this term corresponds to "the bit depth of the samples of the luma array"). Finally, quantization parameter $Qp'_Y$ of the Luminance (or luma) component may be calculated by following Equation 2:

$$Qp'_Y = Qp_Y + \text{QpBdOffsetY} \quad \text{(Equation 2)}$$

The variables qPCb and qPCr are set equal to the value of QpC as specified in a quantization table (e.g. Table 1) based on the index qPi equal to qPiCb or qPiCr, respectively, and qPiCb and qPiCr are derived as follows by Equation 3:

$$qPi_{Cb} = \text{Clip3}(-\text{QpBdOffsetC}, 69, Qp_Y + pps\_cb\_qp\_\text{offset} + \text{slice}\_cb\_qp\_\text{offset})$$

$$qPi_{Cr} = \text{Clip3}(-\text{QpBdOffsetC}, 69, Qp_Y + pps\_cr\_qp\_\text{offset} + \text{slice}\_cr\_qp\_\text{offset}) \quad \text{(Equation 3)}$$

Wherein QpBdOffsetC is a constant offset depended on chroma bit depth (from HEVC standard, this term corresponds to "the bit depth of the samples of the Chroma array"); pps_cb_qp_offset or pps_cr_qp_offset is a fixed offset for Cb component or Cr component signaled by a picture parameter set (PPS), and slice_cb_qp_offset or slice_cr_qp_offset is a fixed offset for Cb component or Cr component which is signaled in a slice header.

$$\text{Clip3}(x, y, z) = \begin{cases} x; & z < x \\ y; & z > y \\ z; & \text{otherwise} \end{cases} \quad \text{(Equation 4)}$$

TABLE 1

Specification of QpC as a function of qPi in HEVC as an example

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $QP_C$ | =qPi | 29 | 30 | 31 | 32 | 33 | 33 | 34 | 34 | 35 | 35 | 36 | 36 | 37 | 37 | =qPi − 6 |

The chroma quantization parameters for the Cb and Cr components ($Qp'_{Cb}$ and $Qp'_{Cr}$, are derived as follows Equation 5:

$$Qp'_{Cb} = qP_{Cb} + \text{QpBdOffsetC}$$

$$Qp'_{Cr} = qP_{Cr} + \text{QpBdOffsetC} \quad \text{(Equation 5)}$$

The variables $qP_{Cb}$ and $qP_{Cr}$ are set equal to the value of $QP_C$ as specified in Table 1 based on the index qPi equal to $qPi_{Cb}$ and $qPi_{Cr}$, respectively.

It should be noted that the above scheme does not allow for flexibly applying different QP values for different coding units (CU). Therefore, CU based delta QP (differential quantization parameter) signaling for chrominance component may be desirable. To specify whether CU based delta QP for chroma is used a cu_chroma_qp_delta_enabled_flag syntax element is signaled in PPS. One example is given in Table 2.

TABLE 2

| | Descriptor |
|---|---|
| pic_parameter_set_rbsp( ) { | |
| ... | |
| cu_qp_delta_enabled_flag | u(1) |
| cu_chroma_qp_delta_enabled_flag | u(1) |
| ... | |
| } | |

It should be noted that signaling of cu_chroma_qp_delta_enabled_flag may be also dependent on cu_qp_delta_enabled_flag value, e.g. perform signaling of cu_chroma_qp_delta_enabled_flag if and only if cu_qp_delta_enabled_flag equals to true.

In another method CU based delta chroma QP can be signaled for Cb and Cr components separately. In this case, two flags cu_cb_qp_delta_enabled_flag and cu_cr_qp_delta_enabled_flag are signaled in the bistream to specify whether CU based delta QP mechanism is used for Cb and Cr components correspondingly. Table 3 gives an example of separated signaling.

TABLE 3

| | Descriptor |
|---|---|
| pic_parameter_set_rbsp( ) { | |
| ... | |
| cu_qp_delta_enabled_flag | u(1) |
| cu_cb_qp_delta_enabled_flag | u(1) |
| cu_cr_qp_delta_enabled_flag | u(1) |
| ... | |
| } | |

In another implementation a flag signaled in PPS can be used to specify whether delta chroma QP is signaled for Cb and Cr component jointly or separately.

Based on PPS control flags syntax elements for represent CU delta QP values CuCbQpDeltaVal and CuCrQpDeltaVal for Cb and Cr components correspondingly are signaled in the bitstream.

The signaled deltaQP can be used in one of the following described methods of derivation of QP values for chroma.

In one method, qPiCb and qPiCr values are calculated by following formulas, replacing the formulas of Equation 3 of the example without differential quantization parameter signaling given above:

$$qPi_{Cb} = \text{Clip3}(-\text{QpBdOffsetC}, 69, Qp_Y + pps\_cb\_qp\_\text{offset} + slice\_cb\_\text{offset} + qPi_{Cb\_A} - QP_{Y\_A\_Cb} + \text{CuCbQpDeltaVal})$$

$$qPi_{Cr} = \text{Clip3}(-\text{QpBdOffsetC}, 69, Qp_Y + pps\_cb\_qp\_\text{offset} + slice\_cb\_\text{offset} + qPi_{Cr\_A} - QP_{Y\_A\_Cr} + \text{CuCrQpDeltaVal})$$

wherein $qPi_{Cb\_A}$ and $qPi_{Cr\_A}$ are set equal to $qPi_{Cb}$ and $qPi_{Cr}$ values corresponding to left neighboring block to current chroma block;

$$QP_{Y\_A\_Cb} = QP_{Y\_A} + pps\_cb\_qp\_\text{offset} + slice\_cb\_\text{offset}$$

$$QP_{Y\_A\_Cr} = QP_{Y\_A} + pps\_cr\_qp\_\text{offset} + slice\_cr\_\text{offset},$$

where $QP_{Y\_A}$ is set equal to the luma quantization parameter $Qp_Y$ of the luma coding unit that has a mapping relation with (is collocated to) the left neighboring block to the current chroma block.

The resulting values of $qPi_{Cb}$ and $qPi_{Cr}$ are then further processed, for instance in accordance with a look-up table such as Table 1 given above, so as to obtain the desired quantization parameter values in accordance with the above Equation 5.

In another method, $QP'_{Cb}$ and $Qp'_{Cr}$ values are calculated by following formulas:

$$Qp'_{Cb} = QP_{Cb} + \text{QpBdOffsetC}$$

$$Q'_{Cr} = QP_{Cr} + \text{QpBdOffsetC},$$

wherein $$QP_{Cb} = \text{Clip3}(0, 63, qP_{Cb} + Qp_{Cb\_A} - Qp_{Y\_A\_Cb} + \text{CuCbQpDeltaVal})$$

$$QP_{Cr} = \text{Clip3}(0, 63, qP_{Cr} + Qp_{Cr\_A} - Qp_{Y\_A\_Cr} + \text{CuCrQpDeltaVal})$$

where the variables $qP_{Cb}$ and $qP_{Cr}$ are set equal to the value of $QP_C$ as specified in Table 1 based on the index qPi equal to $qPi_{Cb}$ and $qPi_{Cr}$, respectively, which are calculated according to Equation 3:

$$qPi_{Cb} = \text{Clip3}(-\text{QpBdOffsetC}, 69, Qp_Y + pps\_cb\_qp\_\text{offset} + slice\_cb\_qp\_\text{offset})$$

$$qPi_{Cr} = \text{Clip3}(-\text{QpBdOffsetC}, 69, Qp_Y + pps\_cr\_qp\_\text{offset} + slice\_cr\_qp\_\text{offset}) \quad \text{(Equation 3)}$$

$Qp_{Cb\_A}$ and $QP_{Cr\_A}$ are $Qp_{Cb}$ and $Qp_{Cr}$ values corresponding to left neighboring block to current chroma block;

$$QP_{Y\_A\_Cb} = \text{QPYA} \, pps\_cb\_qp\_\text{offset} + slice\_cb\_\text{offset}$$

$$QP_{Y\_A\_Cr} = \text{QPYA} \, pps\_cr\_qp\_\text{offset} + slice\_cr\_\text{offset},$$

where $QP_{Y\_A}$ is set equal to the luma quantization parameter $Qp_Y$ of the luma coding unit that has a mapping relation with (is collocated to) the left neighboring block to the current chroma block.

In other words, both the above exemplary methods implement the same idea of additionally taking into account the difference between luminance and chrominance values of the left neighboring block of the current block. Assuming that said difference is similar for the current block and the neighboring blocks, it follows that the magnitude of the remaining differential quantization parameter to be signaled is reduced as compared to a "straightforward" scheme, where the luminance and chrominance values of a neighboring block are omitted in the calculation, similarly to the above described scheme for delta signaling for the chroma component of Equations 1 and 2.

This will be explained below by means of a simple numerical example, given for the case of applying the first one of the above methods.

In the following, for the sake of simplicity, it is assumed that the pps and slice offsets pps_cb_qp_offset and slice_cb_offset as well as the offset QpBdOffsetC are all 0.

Figure 10:
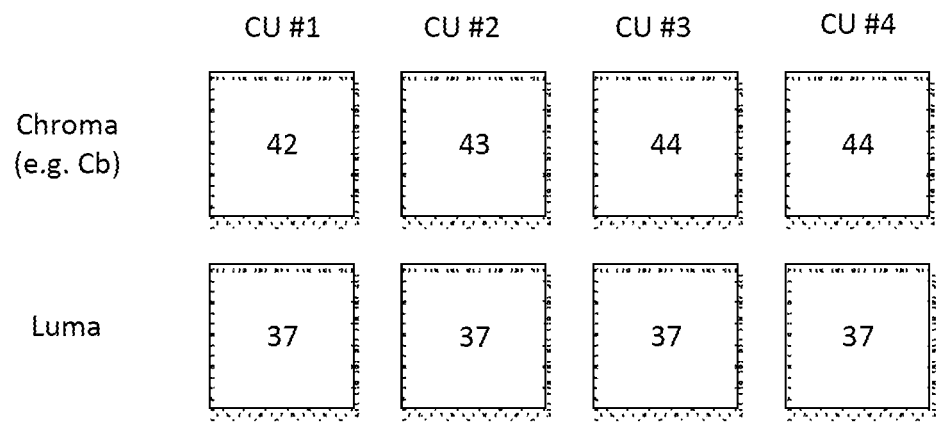
FIG. 10 is an illustration of assumed luma and target chroma quantization parameters for a calculation example according to an embodiment of the present invention.

Imagine there is a set of sequential CUs from 1 to 4 and each CU comprises luma and for simplicity one chroma block. Let us further assume that encoder has already assigned QP for all luma CUs to 37 and chroma QPs are to be assigned differently e.g. 42, 43, 44 and 44 for CUs from 1 to 4 correspondingly. This is illustrated in FIG. 10.

In a "straightforward" method where the luminance and chrominance values of a neighboring block are omitted in the calculation, the formula would be used $qPi_{Cb}$=Clip3(-QpBdOffsetC,69,$QpY$+pps_cb_qp_offset+slice_cb_offset+CuCbQpDeltaVal), where CuCbQpDeltaVal is the value to be signaled. In order to achieve a required chroma, QPs are signaled CuCbQpDeltaVal as follows:

CU#1:To achieve eventually $Qp'_{Cb}$=42,according to Table1$qPi_{Cb}$=48

CuCbQpDeltaVal=$qPi_{Cb}$(required chroma $QP$ index)-$QpY$=48-37=11

CU#2:To achieve eventually $Qp'_{Cb}$=43,according to Table1$qPi_{Cb}$=49

CuCbQpDeltaVal=$qPi_{Cb}$(required chroma $QP$ index)-$QpY$=49-37=12

CU#3:To achieve eventually $Qp'_{Cb}$=44,according to Table1$qPi_{Cb}$=50

CuCbQpDeltaVal=$qPi_{Cb}$(required chroma $QP$ index)-$QpY$=50-37=13

CU#4:To achieve eventually $Qp'_{Cb}$=44,according to Table1$qPi_{Cb}$=50

CuCbQpDeltaVal=$qPi_{Cb}$(required chroma $QP$ index)-$QpY$=50-37=13

In the first one of the above methods, the following modified formula is used:

$qPi_{Cb}$=Clip3(-QpBdOffsetC, 69, $Qp$-$Y$+pps_cb_qp_offset+slice_cb_offset+$qPi_{Cb\_A}$-$QP_{Y\_A\_Cb}$+CuCbQpDeltaVal), where under the same assumptions CuCbQpDeltaVal are signaled as follows:

CU#1:CuCbQpDeltaVal=$qPi_{Cb}$(required chroma $QP$ index)-$QpY$($qPi_{Cb\_A}$-$QP_{Y\_A\_Cb}$)=48-37-(0-0)=11(*no* left neighbor available)

CU#2:CuCbQpDeltaVal=$qPi_{Cb}$(required chroma $QP$ index)-$QpY$-($qPi_{Cb\_A}$-$QP_{Y\_A\_Cb}$)=49-37-(48-37)=1

CU#3: CuCbQpDeltaVal=$qPi_{Cb}$(required chroma $QP$ index)-$QpY$-($qPi_{Cb\_A}$-$QP_{Y\_A\_Cb}$)=50-37-(49-37)=1

CU#4:CuCbQpDeltaVal=$qPi_{Cb}$(required chroma $QP$ index)-$QpY$-($qPi_{Cb\_A}$-$QP_{Y\_A\_Cb}$)=50-37-(50-37)=0

As a result, the values to be signaled are generally of a much smaller magnitude and thus can be coded much more efficiency. In the given simplified example, values of (11, 1, 1, 0) have to be signaled, instead of (11, 12, 13, 13) in case of not using the "existing" QP values of the left neighboring block.

The difference between the two methods described above by way of example is that, in the first method, the luma and chroma QPs of the neighboring block are taken into account in the calculation before applying the look up table (Table 1), for which purpose $qPi_{Cb\_A}$ and $qPi_{Cr\_A}$ are used in the calculation, and in the second method in the final calculation, after applying the look up table, for which purpose $Qp_{Cb\_A}$ and $Qp_{Cr\_A}$ are used in the calculation It should be noted that in both abovementioned methods a joint value CuCQpDeltaVal of chroma delta QP for both Cb and Cr components can be used instead of CuCbQpDeltaVal and CuCrQpDeltaVal.

Figure 8:
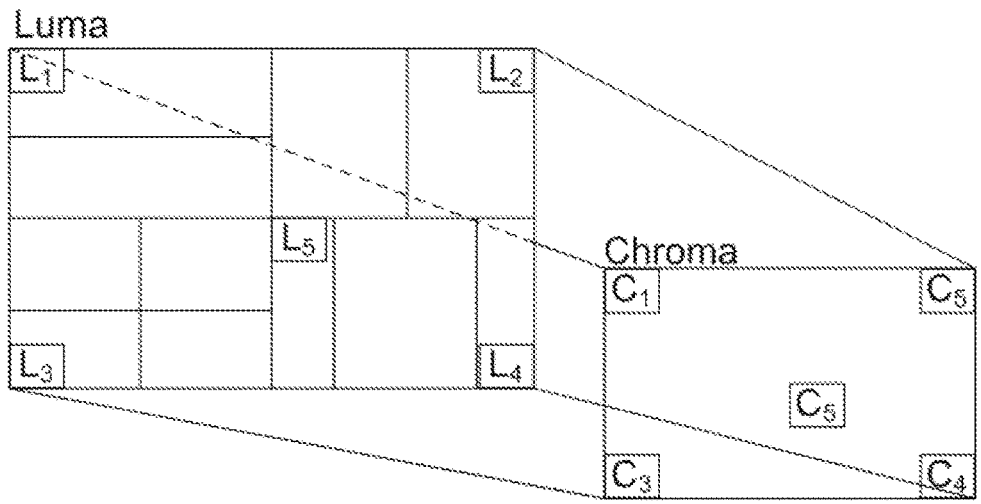
FIG. 8 is a schematic diagram illustrating mapping points from chrominance (or chroma) partitioning to luminance (or luma) partitioning.

In the following, an example of a mapping relation that may exist between a block in the chrominance component and a "collocated" block or "coding unit" in the luminance component will be explained with reference to FIG. 8. FIG. 8 shows a mapping relation between a luminance block ("luma"), which is in itself further partitioned in various ways and a chrominance block ("chroma") which is, in this example not further partitioned. In this exemplary embodiment, the mapping is performed based on the central pixel in the chroma block, i.e. C5 in FIG. 8. More specifically, as the "central pixel" the left upper pixel of the right lower partition of an assumed (imagined) quadtree partition of the whole chrominance block is taken. On this basis, pixel C5 of the chrominance block is mapped to pixel L5 in the luma block. As a consequence, the whole chroma block is mapped to the smallest luma block (luma partitioning unit shown in FIG. 8) that covers pixel L5, i.e. the left block of the ternary tree split that is shown for the right lower block of the luma component. This block is considered as the "collocated" block and the quantization parameter of this block is taken as quantization parameter of the luminance block collocated to the respective chrominance block. In other words, it is these blocks, between which the "predetermined mapping relation" mentioned above exists.

Of course, this particular mapping relation is given by way of example only and other mapping relations, for instance based on any other pixel in the chroma block, are equally possible within the framework of the present disclosure.

Figure 9:
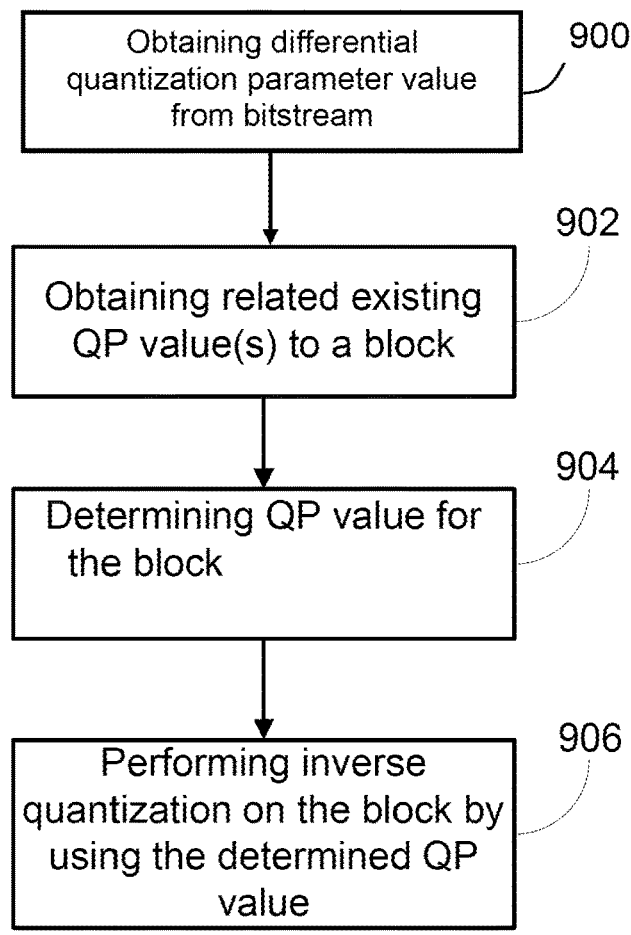
FIG. 9 is an exemplary flowchart illustrating a procedure to determine a QP value for a block in the chroma component (or chroma block QP value).

In general terms, a method of inverse quantization of a current block of a chrominance component of a picture is described with reference to the flowchart of FIG. 9.

In initial step 900, a differential quantization parameter value (delta QP value) is obtained for a current block to be processed by inverse quantization. Specifically, this parameter is signaled in a bitstream and received at the decoder from an encoder.

In the subsequent step 902, available ("existing") quantization parameter values that are related to the current block are obtained. This concerns, in particular, quantization parameter values applicable to a co-located luma block of the current chroma block, and/or one or more neighboring blocks in the luma and/or, component. More specifically, this may be, for example, the quantization parameter applied for inverse quantization of the left neighbor chroma block of the current block and/or the quantization parameter applied for inverse quantization of the luma block co-located to the current chroma block.

In the following step 904, the quantization parameter value for the current block is determined on the basis of the obtained differential quantization parameter value and the further related existing quantization parameter values obtained in step 900 and 902, respectively.

In the final step 906 of the flowchart, the inverse quantization was performed on the current block by using the quantization parameter value determined in step 904.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Appendix

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition

− Subtraction (as a two-argument operator) or negation (as a unary prefix operator)

\* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

x/y Used to denote division in mathematical equations where no truncation or rounding is intended.

$$\sum_{i=x}^{y} f(i)$$

The summation of f(i) with i taking all integer values from x up to and including y.

x%y Modulus. Remainder of x divided by y, defined only for integers x and y with x>=0 and y>0.

Logical Operators

The following logical operators are defined as follows:

x && y Boolean logical "and" of x and y x||y Boolean logical "or" of x and y

! Boolean logical "not"

x? y: z If x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ A Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y..z x takes on integer values starting from y to z, inclusive, with x, y, and z being integer numbers and z being greater than y.

Mathematical Functions

The following mathematical functions are defined:

$$Abs(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right); & x > 0 \\ Atan\left(\frac{y}{x}\right) + \pi; & x < 0\ \&\&\ y >= 0 \\ Atan\left(\frac{y}{x}\right) - \pi; & x < 0\ \&\&\ y < 0 \\ +\frac{\pi}{2}; & x == 0\ \&\&\ y >= 0 \\ -\frac{\pi}{2}; & \text{otherwise} \end{cases}$$

Ceil(x) the smallest integer greater than or equal to x.

Clip1$_Y$(x)=Clip3(0, (1<<BitDepth$_Y$)−1, x)

Clip1$_C$(x)=Clip3(0, (1<<BitDepth$_C$)−1, x $$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

Round(x)=Sign(x)*Floor(Abs(x)+0.5)

$$Sign(x) = \begin{cases} 1; & x > 0 \\ 0; & x == 0 \\ -1; & x < 0 \end{cases}$$

Sin (x) the trigonometric sine function operating on an argument x in units of radians Sqrt(x)=$\sqrt{x}$ Swap(x, y)=(y, x)

Tan (x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)
"x++", "x—"
"!x", "−x" (as a unary prefix operator)
$x^y$
"x * y", "x/y", "x ÷ y", "$\frac{x}{y}$", "x % y"
"x + y", "x − y" (as a two-argument operator),"

$$\sum_{i=x}^{y} f(i)"$$

"x << y", "x >> y"
"x < y", "x <= y", "x > y", "x >= y"
"x == y", "x != y"
"x & y"
"x | y"
"x && y"
"x || y"
"x ? y : z"
"x . . . y"
"x = y", "x += y", "x −= y"

Text Description of Logical Operations

In the text, a statement of logical operations as would be described mathematically in the following form:

if(condition 0)
   statement 0
else if(condition 1)
   statement 1
else /*informative remark on remaining condition */
   statement n may be described in the following manner:

. . . as follows/ . . . the following applies:—

If condition 0, statement 0

Otherwise, if condition 1, statement 1

Otherwise (informative remark on remaining condition), statement n

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

if(condition 0a && condition 0b)
   statement 0
else if(condition 1a||condition 1b)
   statement 1
else
   statement n may be described in the following manner:

. . . as follows/ . . . the following applies:

If all of the following conditions are true, statement 0:
   condition 0a
   condition 0b Otherwise, if one or more of the following conditions are true, statement 1:
   condition 1a
   condition 1b Otherwise, statement n In the text, a statement of logical operations as would be described mathematically in the following form:

if(condition 0)
   statement 0
if(condition 1)
   statement 1 may be described in the following manner:

When condition 0, statement 0
When condition 1, statement 1

What is claimed is:

1. A decoder, comprising:
a non-transitory memory configured to store instructions; and
a processor coupled to the non-transitory memory and configured to execute the instructions to facilitate the following being performed by the decoder:
parsing a bitstream to obtain a differential quantization parameter value for a current block of a chrominance component of a picture;
determining a quantization parameter value for the current block of the chrominance component based on a predetermined function of:
a constant offset based on chroma bit depth;
a constant; and
a sum of a quantization parameter of a luminance component collocated to the current block, a picture parameter set offset, a slice header offset, a quantization parameter for a neighboring block of the chrominance component, a quantization parameter value of a luminance component collocated to the neighboring block, and the obtained differential quantization parameter value;
performing inverse quantization on the current block of the chrominance component by using the determined quantization parameter value, to obtain a dequantized coefficient of the current block; and
obtaining a reconstructed picture at least based on the dequantized coefficient;
wherein the predetermined function is a Clip3 function, wherein:

$$Clip3(x, y, z) = \begin{cases} x; & z < x \\ y; & z > y \\ z; & \text{otherwise} \end{cases},$$

where x is the constant offset based on chroma bit depth, y is the constant, and z is the sum of the quantization parameter of the luminance component collocated to the current block, the picture parameter set offset, the slice header offset, the quantization parameter for the neighboring block of the chrominance component, the quantization parameter value of the luminance component collocated to the neighboring block, and the obtained differential quantization parameter value.

2. The decoder according to claim 1, wherein a luminance component of the picture and the chrominance component of the picture are partitioned by separate partition trees.

3. The decoder according to claim 1, wherein the differential quantization parameter value obtained from the bitstream is valid for both a Cb chrominance component and a Cr chrominance component of the picture.

4. The decoder according to claim 1, wherein the neighboring block is a left neighboring block of the current block.

5. The decoder according to claim 1, wherein the processor is further configured to execute the instructions to facilitate the following being performed by the decoder:
obtaining a partition depth value of the current block; and
determining whether the partition depth value is below a threshold value;
wherein parsing the bitstream to obtain the differential quantization parameter value is based on determining that the partition depth value is below the threshold value.

6. The decoder according to claim 5, wherein the threshold value is determined based on a pre-defined number.

7. The decoder according to claim 5, wherein the threshold value is included in a parameter set included in the bitstream.

8. A non-transitory computer-readable medium having instructions stored thereon, wherein the instructions, when executed by a processor, facilitate:
parsing a bitstream to obtain a differential quantization parameter value for a current block of a chrominance component of a picture;
determining a quantization parameter value for the current block of the chrominance component based on a predetermined function of:
a first constant;
a second constant; and
a sum of a quantization parameter value for a chrominance component from a mapping table, a quantization parameter for a neighboring block of the chrominance component, a quantization parameter value of a luminance component collocated to the neighboring block, and the obtained differential quantization parameter value;
performing inverse quantization on the current block of the chrominance component by using the determined quantization parameter value, to obtain a dequantized coefficient of the current block; and
obtaining a reconstructed picture at least based on the dequantized coefficient;
wherein the predetermined function is a Clip3 function, wherein:

$$Clip3(x, y, z) = \begin{cases} x; & z < x \\ y; & z > y \\ z; & \text{otherwise} \end{cases},$$

where x is the first constant, y is the second constant, and z is the sum of the quantization parameter value for a chrominance component from a mapping table, the quantization parameter for the neighboring block of the chrominance component, the quantization parameter value of the luminance component collocated to the neighboring block, and the obtained differential quantization parameter value.

9. A decoding method, comprising:
parsing a bitstream to obtain a differential quantization parameter value for a current block of a chrominance component of a picture;
determining a quantization parameter value for the current block of the chrominance component based on a predetermined function of:
a first constant;
a second constant; and
a sum of a quantization parameter value for a chrominance component from a mapping table, a quantization parameter for a neighboring block of the chrominance component, a quantization parameter value of a luminance component collocated to the neighboring block, and the obtained differential quantization parameter value;
performing inverse quantization on the current block of the chrominance component by using the determined quantization parameter value, to obtain a dequantized coefficient of the current block; and
obtaining a reconstructed picture at least based on the dequantized coefficient;
wherein the predetermined function is a Clip3 function, wherein:

$$Clip3(x, y, z) = \begin{cases} x; & z < x \\ y; & z > y \\ z; & \text{otherwise} \end{cases},$$

where x is the first constant, y is the second constant, and z is the sum of the quantization parameter value for a chrominance component from a mapping table, the quantization parameter for the neighboring block of the chrominance component, the quantization parameter value of the luminance component collocated to the neighboring block, and the obtained differential quantization parameter value.

* * * * *